Oct. 24, 1939.   R. E. SYKES ET AL   2,177,083
ELECTRICAL CONTROL SYSTEM
Filed April 24, 1937
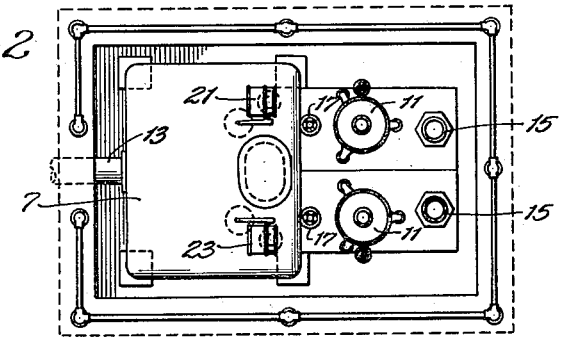
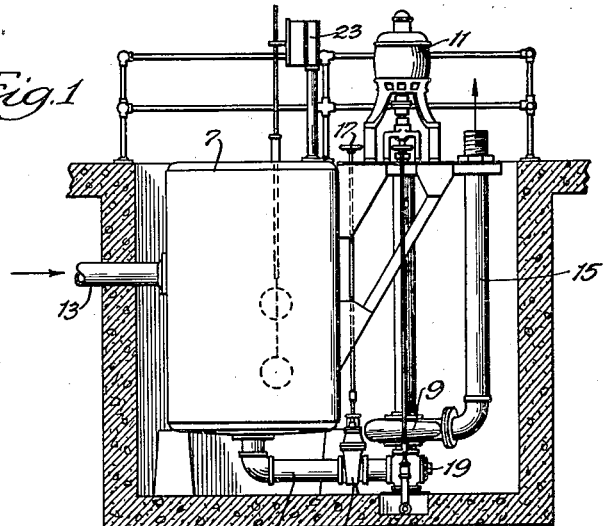
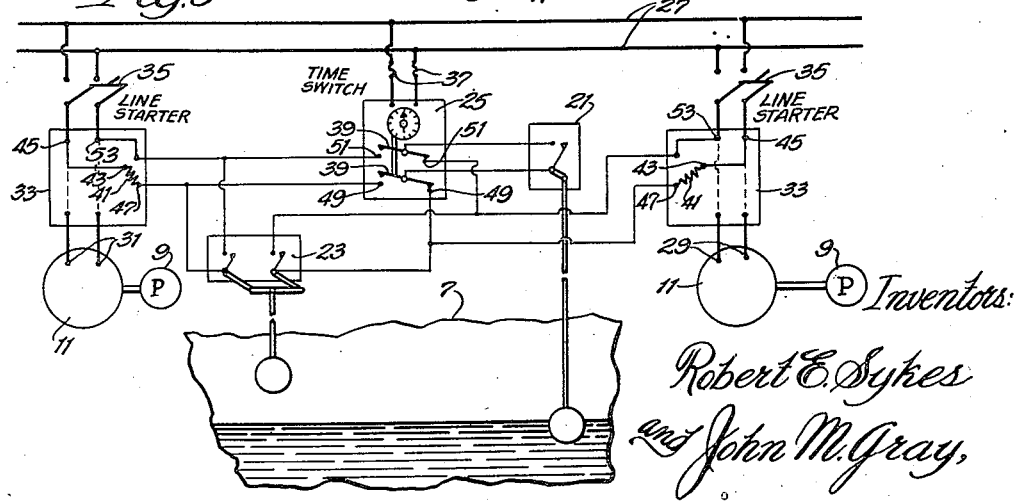
Inventors:
Robert E. Sykes
and John M. Gray,
By Fisher, Clapp, Soans & Pond
Attorneys.

Patented Oct. 24, 1939

2,177,083

UNITED STATES PATENT OFFICE 2,177,083

ELECTRICAL CONTROL SYSTEM

Robert E. Sykes, Battle Creek, Mich., and John M. Gray, Chicago, Ill., assignors to Yeomans Brothers Company, Chicago, Ill., a corporation of Delaware Application April 24, 1937, Serial No. 138,689

2 Claims. (Cl. 172—239)

Our invention relates to the art of electrical control equipment and has particular relation to apparatus for controlling a multiplicity of driving motors which under normal conditions operate alternately or in sequence.

Control apparatus of this type is used, for example, for controlling the operation of the sewage ejection equipment forming a part of the plumbing systems of office and apartment buildings and the like. The need for such equipment arises from the fact that the basements of practically all large buildings are located a substantial distance below the sewer level, and hence, in order to eliminate sewage waste from such buildings, it is necessary to pump it into the sewer. It is imperative, of course, that the ejector equipment shall be absolutely reliable in operation, and accordingly, it is customary to provide this equipment with multiple pumping and motor units.

Each of the pumping units of an ejector equipment should of itself be capable of handling the normal sewage load, and to assure that each unit shall be continuously ready for operation, it is highly desirable that the apparatus shall include means which is actuable to cause alternate operation of the motor and pumping units. Time clocks have been found particularly suitable for this purpose and have been used to some extent in the past. Also, manual operation has been used in some installations.

None of the prior art arrangements, however, is completely capable of taking care of all of the possible eventualities which may arise during the operation of this type of equipment, and the principal object of the present invention is to provide an improved, automatically operable control system for use with a plurality of motor units such as those constituting a part of the equipment described in the foregoing, which will not only operate satisfactorily under all conditions, but will also minimize wear of the controlled equipment.

Somewhat more particularly, it is an object of the present invention to provide a simple motor control system for a plurality of motors which, during its ordinary operation, shall cause alternate or sequential operation of the several motors, thereby equalizing wear, and at the same time assuring that each unit shall be at all times ready for operation, and which also shall be capable of automatically accommodating itself to abnormal conditions which might require the simultaneous operation of a plurality of motors, or the operation of a unit normally de-energized at the time.

Other objects and advantages of the invention will be made more apparent by reference to the accompanying drawing and the following description of one form of our invention. In the drawing:

Figure 1 is a side elevational view of a multiple unit sewage ejector equipment of the type to which the present is particularly applicable;

Figure 2 is a plan view of the ejector equipment illustrated in Figure 1; and

Figure 3 is a schematic view of the motor control circuit of the present invention.

Referring to the drawing, the ejector equipment therein illustrated includes a tank 7 for receiving the sewage or other waste material and a pair of centrifugal pump units 9 arranged to raise the material discharged into the tank 7 into a sewer. A separate motor 11 is provided for driving each of the pump units 9. The sewage or other material is led into the ejector tank through a pipe 13, and the equipment includes other piping 15 extending from the bottom of the tank 7 to the pump units 9 and from the pump units to the sewer. For servicing the apparatus, valves and hand holes may also be provided as indicated at 17 and 19.

The amount of sewage to be disposed of by an ejector of this type will, of course, vary between relatively wide limits, and while during normal operation of the ejector it will at times be necessary to operate one of the pump units 9 substantially continuously, there will be periods when no pumping at all will be required. At other times emergency conditions may require the simultaneous operation of both of the pump units 9.

In order that operation of the pump units 9 can be made responsive to the inflow of sewage or other waste into the tank 7, the apparatus includes two float switches, indicated generally at 21 and 23 in the drawing, and adapted to be operated by suitable floats located within the tank 7. The operating float for the switch 21 is at a lower level than the float of the other switch 23.

The several elements of the motor control system of our invention and the electrical connections for those elements are illustrated particularly in Figure 3. Referring to that figure, a direct or alternating power supply source which may be single-phase or poly-phase is indicated at 27, and the terminals of the motor units 11 are indicated at 29 and 31. Each of the motor units 11 is arranged to be connected to the power source through an electrically operated switching equipment which preferably includes a line starter 33. Knife switches 35 or the like permit the complete disconnecting of the switching equipment from the power source. The system includes a double pole, double throw time switch 25 which is preferably electrically operated. If desired, protective fuses 37 may be introduced into the time switch circuit.

In the structure disclosed, the control apparatus is operated from the same power source as the motors. It will be understood, of course, that a separate source or sources of power may be utilized for energizing the control equipment if such use is desirable or preferred.

The float switch 21 which is operated by the lower level float is ordinarily designated as the service switch, and is of the single pole, single throw type. When operated, the service switch is arranged to short circuit the mechanically interconnected blades 39 of the time switch 37. Normally, the service switch 21 is in the open position. The other float switch 23 is of the two pole, single throw type and is likewise normally in the open circuit position. Since the operating float for the switch 23 is located at a higher level than the operating float for the service switch, the switch 23 will be operated only in response to emergency conditions.

Each of the line starters 33 includes an operating coil 41, one terminal 43 of which is connected directly to one side of the power source as at 45. The other terminals 47 of the operating coils 41 are connected to opposite terminals 49 of the lower pole of the time switch. The terminals 51 of the upper pole of the time switch are permanently connected to the other side of the power source as at 53.

Since the service switch 21 serves to short circuit the blades 39 of the time switch 25 when it is operated, it will be apparent that the operation of the service switch will serve to energize whichever of the coils 41 is then connected to the blades 39. Accordingly, the periodic operation of the time switch will serve to automatically accomplish alternate operation of the motor units 11 in response to the normal operation of the service switch 21. It will ordinarily be found that operation of the time switch 25 in twelve hour periods will prevent unreasonable accumulations of sediment or the like in either of the pump units 9 and will assure that both units are at all times ready for operation, as well as equalizing wear on those units. Each pole of the emergency switch 23 is arranged to short circuit one side of the time switch 25, i. e. one pair of the terminals 49 and 51, and hence, when the emergency switch is operated it effects the energization of both of the line starter operating coils 41, regardless of the position of the time switch.

Thus during the operation of the ejector equipment, if the motor unit 11 which is brought into operation by the closing of the service switch 21, or the line starter connected thereto, is for some reason inoperative or incapable of removing the material from the tank at a rate at least equal to the inflow, the liquid level will continue to rise and will eventually actuate the emergency switch 23. The effect of this will be to energize both of the operating coils 41 of the starting units and will, therefore, effect the energization of both of the motor units 11, regardless of the position of the time switch.

The manner of operation brought about by the combination of the service switch 21 and the emergency switch 23 assures even wearing of the pumping equipment during normal operating service, and prevents any one of the units from becoming inoperative from disuse. At the same time, the arrangement assures that the ejector equipment will not fail to operate in the event that one of the pump units shall become inoperative for any reason, or in the event that unusually heavy inflow shall occur into the ejector tank. This improved operation is accomplished by virtue of the simple, novel motor control system which we have disclosed.

It will be apparent that this novel control system may be utilized in conjunction with various forms of equipment embodying duplex or multiple motor units in addition to the ejector pump units disclosed in the foregoing. In this regard, particular attention is directed to the fact that the opening of either of the line switches 35 serves to completely de-energize the motor unit 11 and the motor starting equipment 45 connected to such line switch, and that the operation of the motor control equipment cannot, in any possible event, energize the motor or the motor starting equipment connected to the opened line switch. This arrangement assures that repair or servicing work on either of the motor units and the associated starting equipment can be carried out in absolute safety, without requiring the shutting down of the other pump or otherwise interfering with the operation of the ejector. It is our desire that the accompanying claims shall be accorded the broadest reasonable construction, and shall be limited only by what is expressly set forth therein and by the prior art.

We claim the following as our invention:

1. In a motor control circuit, a double pole, double throw time switch having a blade and two opposed terminal contacts in each pole thereof, a pair of automatically actuable motor starting equipments, each of which includes an operating coil, a source of power, means electrically connecting one end of each of said operating coils to one side of said source of power, means connecting the other ends of said operating coils respectively to opposite terminal contacts of one of the poles of said time switch, means connecting the other side of said source of power to both of the opposite terminal contacts of the other pole of said time switch, a single pole control switch operable upon the occurrence of predetermined conditions to short circuit the blades of said time switch and thereby accomplish the energization of that operating coil which is connected to the terminal contact then engaged by one of the blades of said time switch, and a double pole, single throw control switch operable upon the occurrence of other predetermined conditions to short circuit the pole terminals at both ends of said time switch whereby the simultaneous energization of both operating coils is effected independently of the position of said time switch and of said first mentioned control switch.

2. In a motor control circuit, a double pole, double throw alternating switch having a blade and two opposed terminal contacts in each pole thereof, means operable upon the occurrence of certain conditions to move the blades of said alternating switch from one closed circuit position to the other, a pair of automatically actuable motor starting equipments each of which includes an operating coil, a source of power, means electrically connecting one end of each of said operating coils to one side of said source of power, means connecting the other ends of said operating coils respectively to opposite terminal contacts of one of the poles of said alternating switch, means connecting the other side of said source of power to both of the opposite terminal contacts of the other pole of said alternating switch, a single pole service switch operable upon the occurrence of predetermined condition to short circuit the blades of said alternating switch and thereby accomplish the energization of that operating coil which is connected to the terminal contact then engaged by one of the blades of said alternating switch, and a double pole, single throw emergency switch operable upon the occurrence of other predetermined conditions to short circuit the two terminal contacts at each of the opposite ends of said alternating switch whereby the simultaneous energization of both operating coils is effected independently of the position of the blades of said alternating switch and of said service switch.

ROBERT E. SYKES.
JOHN M. GRAY.